United States Patent [19]
Ohta et al.

[11] Patent Number: 5,423,412
[45] Date of Patent: Jun. 13, 1995

[54] RUBBER TIRE SEPARATION AND TRANSPORT APPARATUS

[75] Inventors: Yasuhiro Ohta, Nara; Masaru Umemoto, Osaka, both of Japan

[73] Assignee: Tsubakimoto Chain Co., Japan

[21] Appl. No.: 272,110

[22] Filed: Jul. 7, 1994

[30] Foreign Application Priority Data

Feb. 8, 1994 [JP] Japan .................. 6-034254

[51] Int. Cl.⁶ .................................. B65G 47/12
[52] U.S. Cl. ................... 198/443; 198/445; 198/453
[58] Field of Search ............. 198/396, 397, 443, 445, 198/453, 690.2

[56] References Cited

U.S. PATENT DOCUMENTS

| | | | |
|---|---|---|---|
| 3,288,265 | 11/1966 | Smith | 198/443 |
| 3,326,351 | 6/1967 | Ross | 198/690.2 |
| 3,934,718 | 1/1976 | Kupper | 198/453 |
| 4,811,832 | 3/1989 | Niemann | 198/690.2 |
| 4,932,513 | 6/1990 | Michimae et al. | 198/443 |
| 5,236,077 | 8/1993 | Hoppmann et al. | 198/397 |
| 5,307,922 | 5/1994 | Ohta et al. | 198/453 |

*Primary Examiner*—Joseph E. Valenza
*Attorney, Agent, or Firm*—Quarles & Brady

[57] ABSTRACT

The sharply inclined transport surface of a slat conveyor is divided into an individual conveyance surface section and a sliding surface section; and a support plate in said individual conveyance surface section supporting only one rubber tire laid flat on said individual conveyance surface section is mounted at a larger pitch in the direction of transport than the maximum diameter of the rubber tire being conveyed. A mixed-suspended state collapsing member is mounted on a frame of said slat conveyor so as to project toward said rubber tire sliding surface section. Not only is a single rubber tire separated and carried out by a support plate but also a plurality of tires not supported by the support plate but being carried upward together in the sharply inclined individual transport zone of the slat conveyor may be raised by the mixed-suspended state collapsing member which is fixedly mounted protrusively on the sliding surface section, and securely returned to the horizontal take-in zone. Therefore, in the horizontal discharge zone, the individual separation-transport apparatus can discharge the rubber tires one by one, displaying a further great effect of individual separation and transport of the rubber tires in a lump which are otherwise not easy to separate because of a great surface friction coefficient.

3 Claims, 9 Drawing Sheets

RUBBER TIRE SEPARATION AND TRANSPORT APPARATUS

FIELD OF THE INVENTION

The present invention relates to apparatus for separation and transport of used tires, or waste tires, to be utilized as an auxiliary fuel for cement calcination.

BACKGROUND OF THE INVENTION

Waste tires, in recent years, are passed through a preheater and charged into a kiln for firing when used as an auxiliary fuel for calcination of cement. Since the kiln is operated for 24 continuous hours, and moreover requires a kiln temperature control, a tire charge interval is determined by calculating the weight and calories of tires to be charged at the charging port of the preheater. It is therefore necessary to feed the waste tires one by one into the charging port of the preheater.

As means for separating and conveying waste tires one by one from a stack yard, techniques disclosed in Japanese Patent Publication Nos. 11808/1982 and 11955/1988 have previously been utilized. In the above-described prior art references, the former shows an individual separating technique utilizing a water stream, in which, because the tire floats, it is necessary to build a larger pool for holding a multitude of tires in order to maintain a substantial number of tires to be continuously supplied to the preheater. Furthermore, since the large pool is set outdoors, the flow of the tires will sometimes be disturbed by an outside air stream flowing counter to the water stream. In addition, water is likely to enter the circular space of the tire, requiring the difficult task of removing the water. The second reference shows a transport technique for classifying separated waste tires by size, not a technique for separating and transporting only one of a plurality of waste tires that are being carried together without being individually separated.

SUMMARY OF THE INVENTION

The present invention provides a rubber tire separation and transport apparatus in which a plurality of rubber tires carried through a sharply inclined individual transport zone in a mixed-suspended condition are dropped, and all of these tires except one supportedly held by a support plate are slid down for the purpose of separation and transport of only the retained tire. As used throughout this disclosure, a mixed-suspended condition of the tires refers to the collected, interconnected, sometimes overlapping state of the tires when accumulated in a confined space such as a storage hopper or a conveyor channel. This mixed-suspended state can include tires lying on one another, which is difficult to separate due to the high coefficient of friction between the engaging rubber surfaces of the tires. The conveyance surface of a slat conveyor is divided into a longitudinally extending, rubber tire individual conveyance surface section and an adjacent rubber tire sliding surface section, and stationary side walls are erected along both side ends of said slats; a support plate supporting only one rubber tire laid flat in said individual conveyance surface section is mounted at a larger pitch in the direction of transport than the maximum diameter of the rubber tire being conveyed; and a mixed-suspended state collapsing member is mounted on a frame of said slat conveyor so as to project toward said rubber tire sliding surface section.

One tire supported on the support plate goes up in the sharply inclined individual transport zone in such a stabilized position that it lies flat on the slat surface. Tires held between the adjacent tires supported by the support plates or tires held between a tire supported by the support plate and the stationary side wall may be carried upward in a mixed-suspended state. If such a mixed-suspended state continues, it is likely that more than one tire in a mixed-suspended state could be discharged to the discharge zone. Thus, a mixed-suspended state collapsing member is provided over the sliding surface section so as to cause the mixed-suspended state to collapse such that the accompanying tires not supported by a support plate may be forced to drop downward, insuring the elimination of the mixed-suspended state.

There can be more than a single individual conveyance section and a sliding surface section. In case one individual conveyance section and one sliding section are provided, an upright plate may preferably be erected to contact with the periphery of a rubber tire at only one end part of each slat in the individual conveyance surface section.

According to said structure, if a plurality of tires held between the one tire on the support plate, which is stopped from moving sideward by the upright plate, and the side wall fixedly mounted along the side edge of the sliding surface section goes upward on the inclined transport zone, one of the accompanying tires moving upward in contact with the stationary side wall will rotate in the direction of rotation on the stationary side wall along with the upward travel of the slat conveyor. Other accompanying tires moving upward are turned in an opposite direction.

The tires thus turned come in contact with one tire supported on the support plate. However, since the one tire thus supported contacts the upright plate mounted on the slat. Consequently, the accompanying tires held between the tires in contact with the stationary side wall and the one tire supported on the support plate are sprung out upward, falling from the mixed-suspended state, and accordingly, a plurality of accompanying tires other than the one tire supported on the support plate are all guided to the sliding surface section where they are free to slide down onto the slat conveyor in the horizontal take-in zone.

When a tire slips on the stationary side wall due to the presence of oil on the peripheral surface of the tires in contact with the stationary side wall, the tire will not rotate; consequently, when the tire will not fall easily from the accompanying state, a plurality of tires could be carried in this state to the horizontal discharge zone. To separate the tires from the mixed-suspended state, a mixed-suspended state collapsing member is employed to cause such a mixed-suspended state to collapse.

The individual conveyance surface sections and sliding surface sections may be provided in a plurality of rows; for example, an arrangement in which individual conveyance surface sections of number n and sliding surface sections of number n−1, or an arrangement in which individual conveyance surface sections of number n and sliding surface sections of number n−1 may increase the capacity of rubber tires supplied to a kiln.

BRIEF DESCRIPTION OF THE DRAWINGS

A greater understanding of the invention and its various embodiments can be gained from a reading of the following detailed description in connection with the accompanying drawings, in which.

DETAILED DESCRIPTION OF PREFERRED EMBODIMENTS

Figure 1:
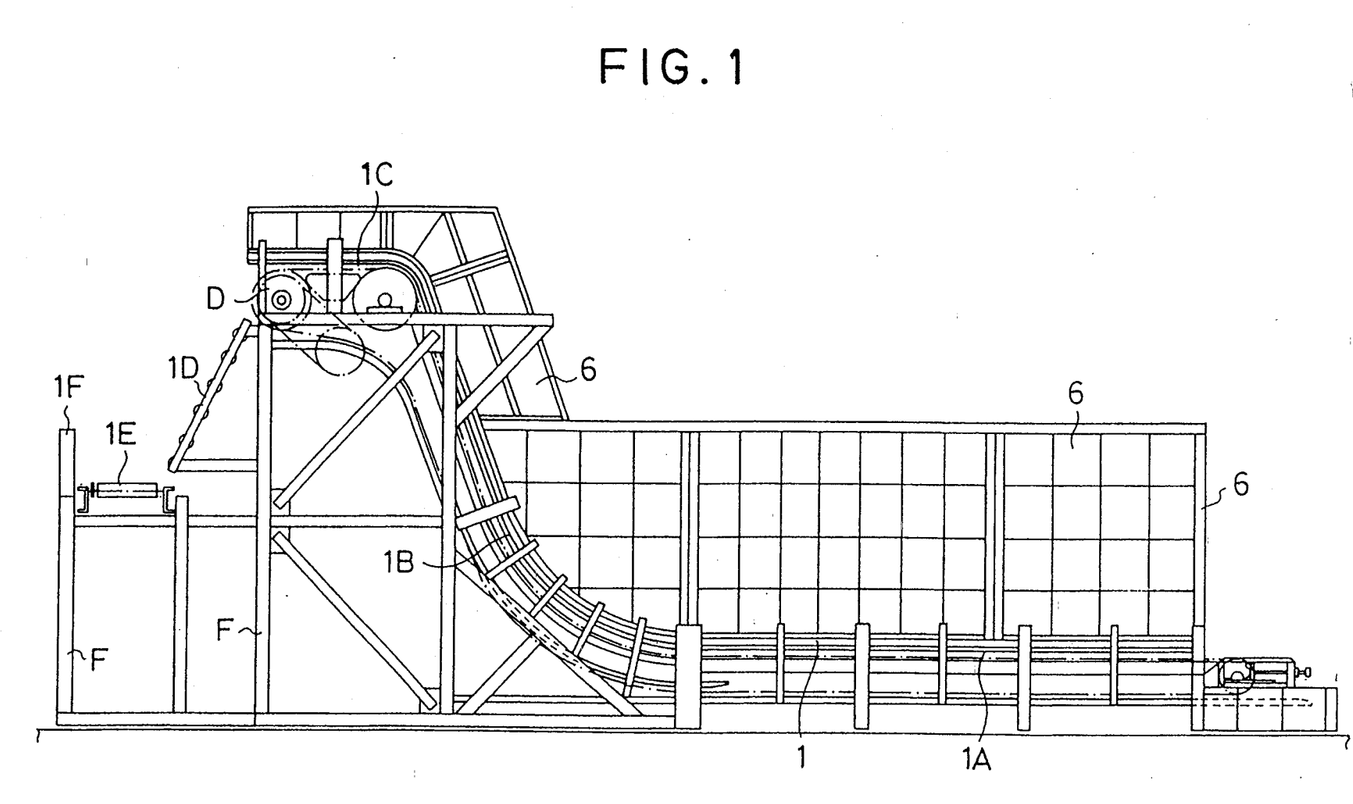
FIG. 1 is a front view of an embodiment of the present invention.
Figure 2:
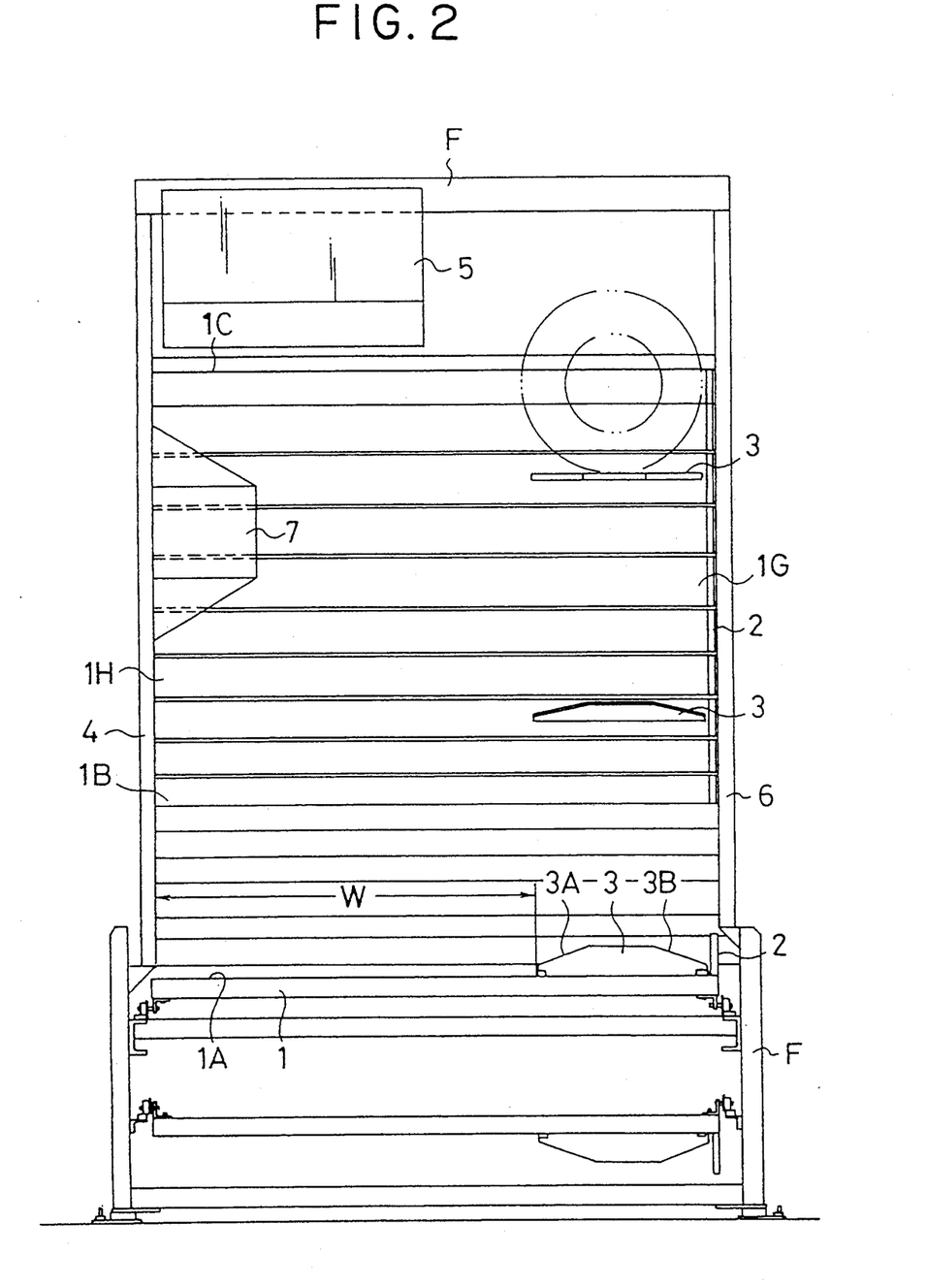
FIG. 2 is an enlarged right side view of FIG. 1.
Figure 3:
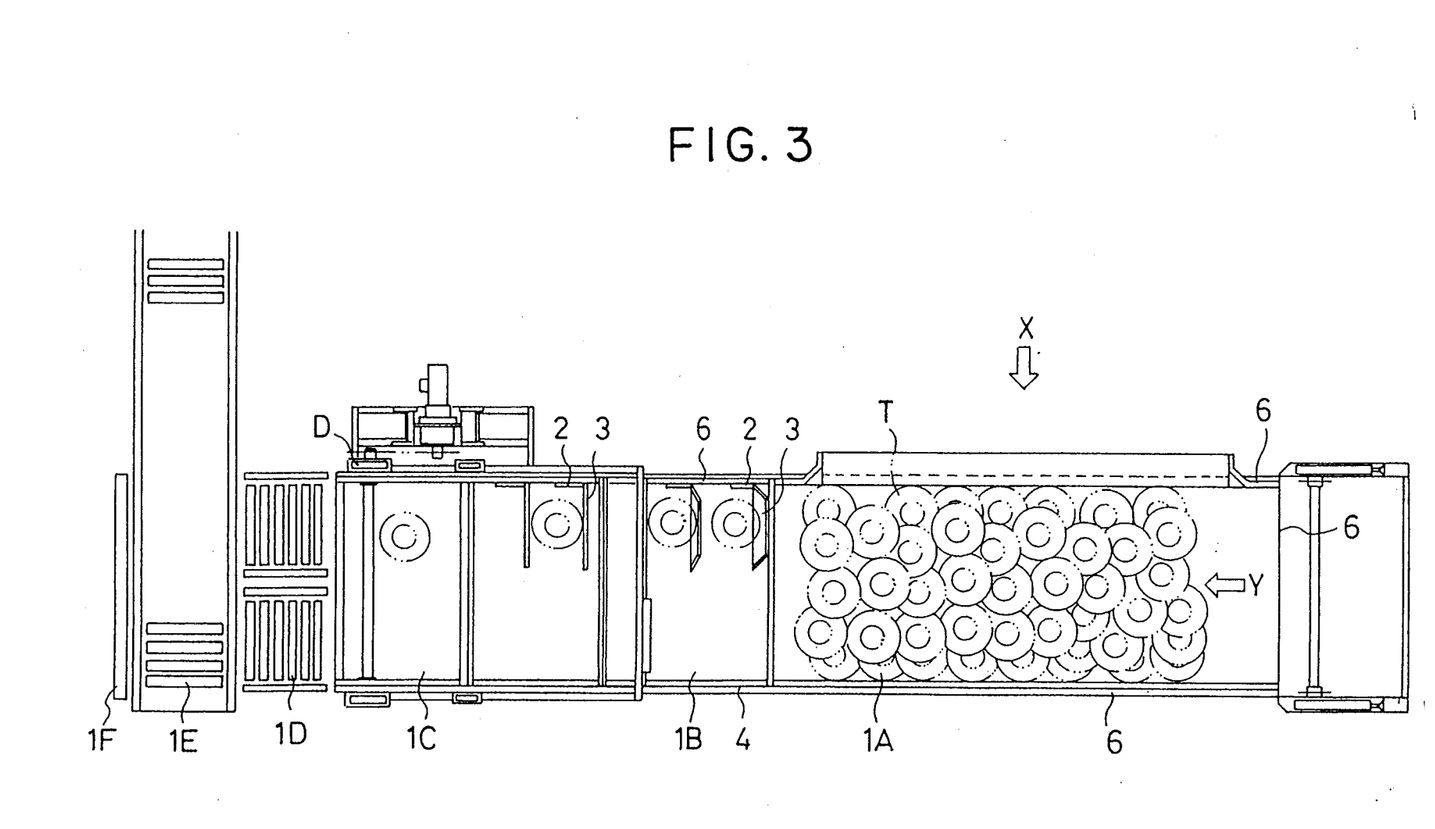
FIG. 3 is a plan view of FIG. 1.

FIGS. 1 to 5 show an embodiment of a rubber tire individual separation and transport apparatus according to the present invention, in which FIG. 1 is a front view of the rubber tire individual separation ad transport apparatus, FIG. 2 is an enlarged right side view of FIG. 1 and FIG. 3 is a plan view of FIG. 1. A slat conveyor 1 for separation and transport of tires (hereinafter termed the "individual separation conveyor") is an endless slat conveyor having an approximately Z-shaped transport route which includes a horizontal take-in zone 1A for feeding a scattered plurality of rubber tires, a sharply inclined individual transport zone 1B, connected to the take-in zone 1A, for individually separating rubber tires, and a horizontal discharge zone 1C, connected to the sharply inclined individual transport zone 1B. This slat conveyor 1 is supported by a frame F and driven by a driving pulley D. Downstream of the horizontal discharge zone 1C are supported an inclined free roller conveyor 1D, a driven roller conveyor 1E, which is transversely disposed relative to said free roller conveyor 1D, and stop means 1F disposed so as to prevent the bumping of rubber tires discharged from said horizontal discharge zone 1C to said free roller conveyor 1D.

As shown in FIG. 2, the surface of the individual separation conveyor 1 is divided into a longitudinally extending individual conveyance surface section 1G and an adjacent sliding surface section 1H. In the individual conveyance surface section 1G, as shown in FIG. 2, the upright plate 2 is fixedly mounted only on the end part of each slat, and an approximately trapezoidal rubber tire support plate 3 is mounted upright. The support plate 3 is required to be a little smaller in height than the axial width of the rubber tire, and a little smaller in length than the diameter of the rubber tire. The support plate 3 supports the lower end of the rubber tire circumference in the sharply inclined transport section 1B, and should be long enough to securely hold the tire in the event of a slight change in the position of the tire center. Also, the mounting pitch of the support plate 3 at front and rear in the direction of transport is sufficient if it is larger than the maximum diameter of a rubber tire to be individually separated and transported. The erected shape of the support plate 3 is a trapezoid having gently sloping surfaces with both ends of the top side cut off.

A stationary side wall 4 is installed upright along the side edge of the sliding surface section. The width W between the stationary side wall 4 and the left end (in FIG. 2) of the support plate 3 is set larger than the maximum diameter of the rubber tire, allowing the rubber tire to slide down smoothly in the sliding surface section 1H of the sharply inclined transport section 1B.

Figure 5:
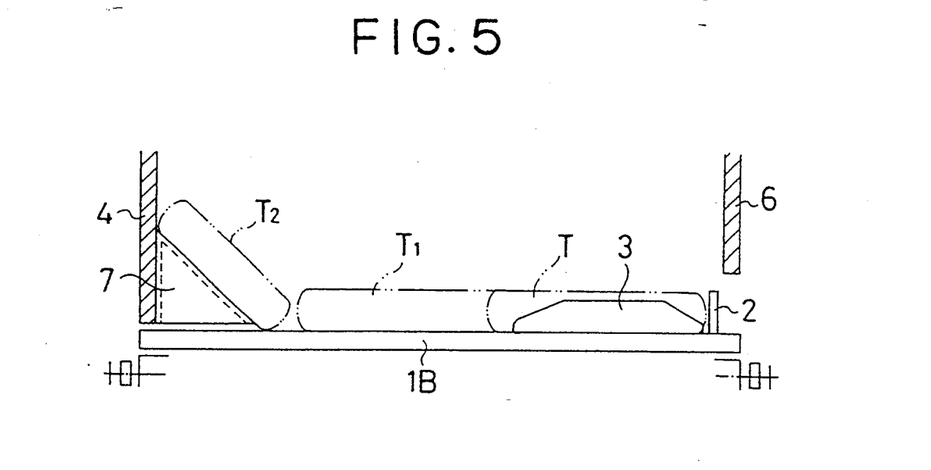
FIG. 5 is a view illustrating the dropping of the rubber tires from the mixed-suspended state by use of a scooping guide member.

As shown in FIGS. 2 and 5, on the stationary side wall 4, rubber tire scooping guide plate 7 is protrusively installed close to the sliding surface in the vicinity of the top end of upward travel of the sharply inclined transport section 1B.

Figure 6:
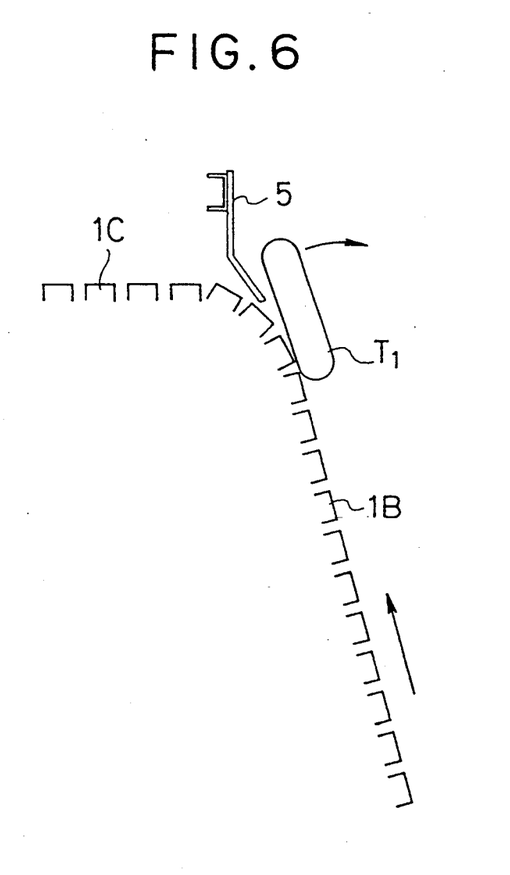
FIG. 6 is a view illustrating the dropping of the rubber tires from the mixed-suspended state by use of a mixed-suspended state collapsing member.

Also, as shown in FIGS. 2 and 6, a mixed-suspended state collapsing member 5 is protrusively installed close to the sliding surface at the top end thereof. The mixed-suspended state collapsing member 5 has the width to let only a tire held by the support plate 3 pass such that the tires in a mixed-suspended state on the sliding surface section 1H may not be discharged to the horizonal discharge zone 1C. The mixed-suspended state collapsing member 5 according to the illustrated embodiment hangs downward from the frame F; however, it may protrude horizontally from the frame F.

On the side edge of the individual conveyance surface section of the slat conveyor 1 a side wall 6 is installed upright to prevent the fall of the rubber tires during transport laterally from the slat conveyor 1 surface. In the horizontal take-in zone 1A, a stationary side wall is provided also on the starting end side of the conveyor, forming a rubber tire supply hopper enclosed with stationary wells on three sides.

As shown in FIG. 3, the rubber tires that have been discharged downward in the direction of the arrow X from the rubber tire feed conveyor mounted above the horizontal take-in zone 1A, falling to scatter on the horizontal take-in zone 1A of the slat conveyor 1, are transported in the direction of the arrow Y by the slat conveyor 1. When the rubber tires reach the sharply inclined transport zone 1B, only one rubber tire, supported on the support plate 3, will be carried upward to be discharged out from the horizontal discharge zone 1C via the free roller conveyor 1D to the driven roller conveyor 1E. A steel-plate chute may be employed in place of the free roller conveyer 1D.

Figure 4:
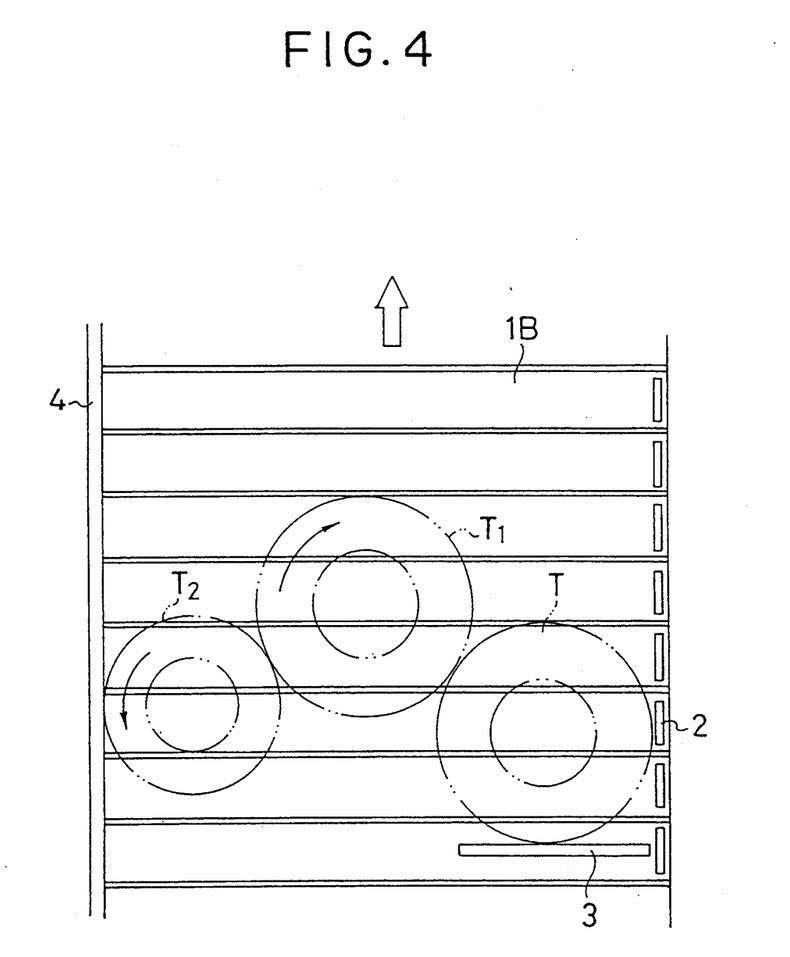
FIG. 4 is a view illustrating the mode of dropping of the rubber tires from mixed-suspended states.

At this time, as shown in FIG. 4, if the rubber tires flow in a mixed-suspended condition in the sharply inclined transport zone 1B, other tires T1 and T2 not supported on the support plate 3 are carried upward together. The tire T2 contacts the stationary side wall 4 to rotate counterclockwise in the direction of the arrow, thus rotating the tire T1 clockwise. However, the upright plate 2 fixedly mounted on the slat, will not rotate; consequently, the tire T1 rotates clockwise, being pushed out upward from between the tires T and T2 and accordingly being separated from the mixed-suspended condition. The tires T1 and T2 slide down the sharply inclined conveyor surface of the slat conveyor, and therefore, only the tire T supported on the support plate 3 is suspended to be discharged out the horizontal discharge zone 1C.

If the peripheral surface of an accompanying tire moving upward in contact with the stationary side wall slips and therefore is not rotating, the tire T2 will be raised by the scooping guide member 7 shown in FIGS. 2 and 5, causing the tire T1 to slide down fully from the mixed-suspended condition and further allowing the tires T1 and T2 to be dropped and guided to the support plate side on the horizontal take-in zone 1A. The upstream and downstream sides of the guide member 7 are formed with tapers.

Should the mixed-suspended condition be not overcome by the scooping guide member 7, at the upper end of the sharply inclined individual conveyance zone 1B, the upper end of the tire T1 abuts against the mixed-suspended state collapsing member 6, as shown in FIGS. 2 and 6, thereby forcibly breaking the mixed-suspended state of the tires T1 and T2 so that the may go down the sliding zone so as to be returned to the horizontal take-in zone 1A.

By providing a mixed-suspended state collapsing member 5 adjacent to the scooping guide member 7, the tire T2 raised by the scooping guide member 7 may be securely forced to go downward by means of the mixed-suspended state collapsing member 5.

When both ends of the top side of the support plate 3 are formed at corner sections, it is likely that the corner sections will be caught by a tire center hole when moving upward; this problem can be prevented by cutting off the corner sections to form gently sloping surface 3A and 3B.

Figure 7:
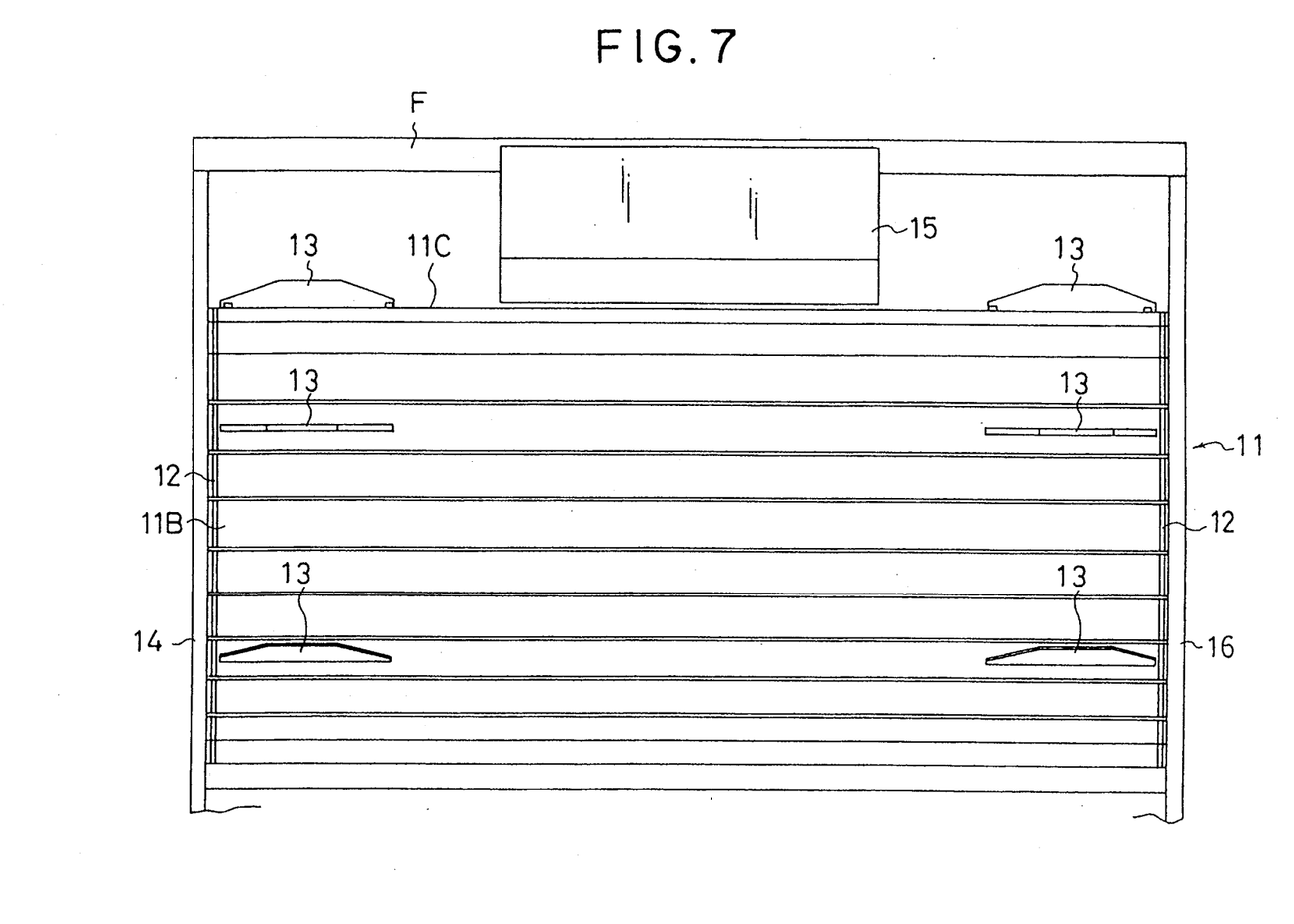
FIG. 7 is an enlarged right side view of another embodiment of the present invention.
Figure 8:
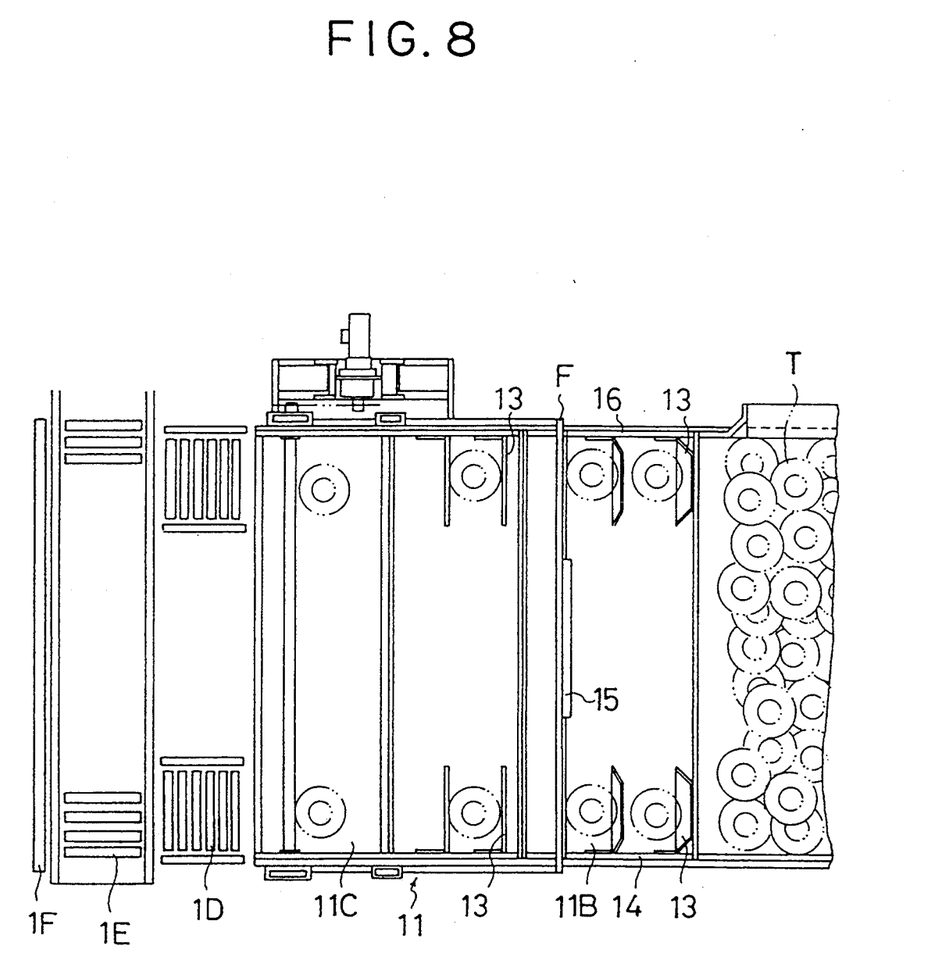
FIG. 8 is a partial plan view of FIG. 7.

FIGS. 7 and 8 illustrate another embodiment of the present invention, FIG. 7 being an enlarged right side view and FIG. 8 being a partial plan view of FIG. 7. In this embodiment, the individual separation transport slat conveyor 11 has a width larger than that of the first embodiment with a view to increasing the supply capacity of rubber tires to a kiln. The width of the slat conveyor 11 is more than three times larger than the diameter of the rubber tire to be conveyed. The individual separation conveyor 11 has two individual conveyance sections at both sides and a single sliding surface section in the center. As shown in FIG. 7, at both side ends of each slat, an upright plate 12 is erected; and on each slat, a rubber tire support plate 13, which is trapezoidal, is provided at both ends. The structure of the support plate 13 is the same as hereinabove described with respect to support plate 3.

At the upper end of the sliding surface section, a mixed-suspended state collapsing member 15 is protrusively installed close to the sliding surface. The mixed-suspended state collapsing member 15 has the width to let only tires held by the support plates 13 pass such that the tires in a mixed-suspended state in the sliding surface section may not be discharged to the horizontal discharge zone 11C.

On both side edges of the individual conveyance surface sections of the slat conveyor 11 side walls 14 and 16 are installed upright to prevent the fall of the rubber tires during transport laterally from the slat conveyor 11 surface.

In operation, as shown in FIG. 7, if a mixed-suspended condition arises on the sharply inclined conveyance section 11B, other tires not supported on the support plates 13 tend to be carried upward together. At the upper end of the sharply inclined individual conveyance zone 11B, the upper end of the accompanying tire abuts against the mixed-suspended state collapsing member 15, thereby forcibly breaking the mixed-suspended state of the tires so that they may go down the sliding zone so as to be returned to the horizontal take-in zone 11A.

Figure 9:
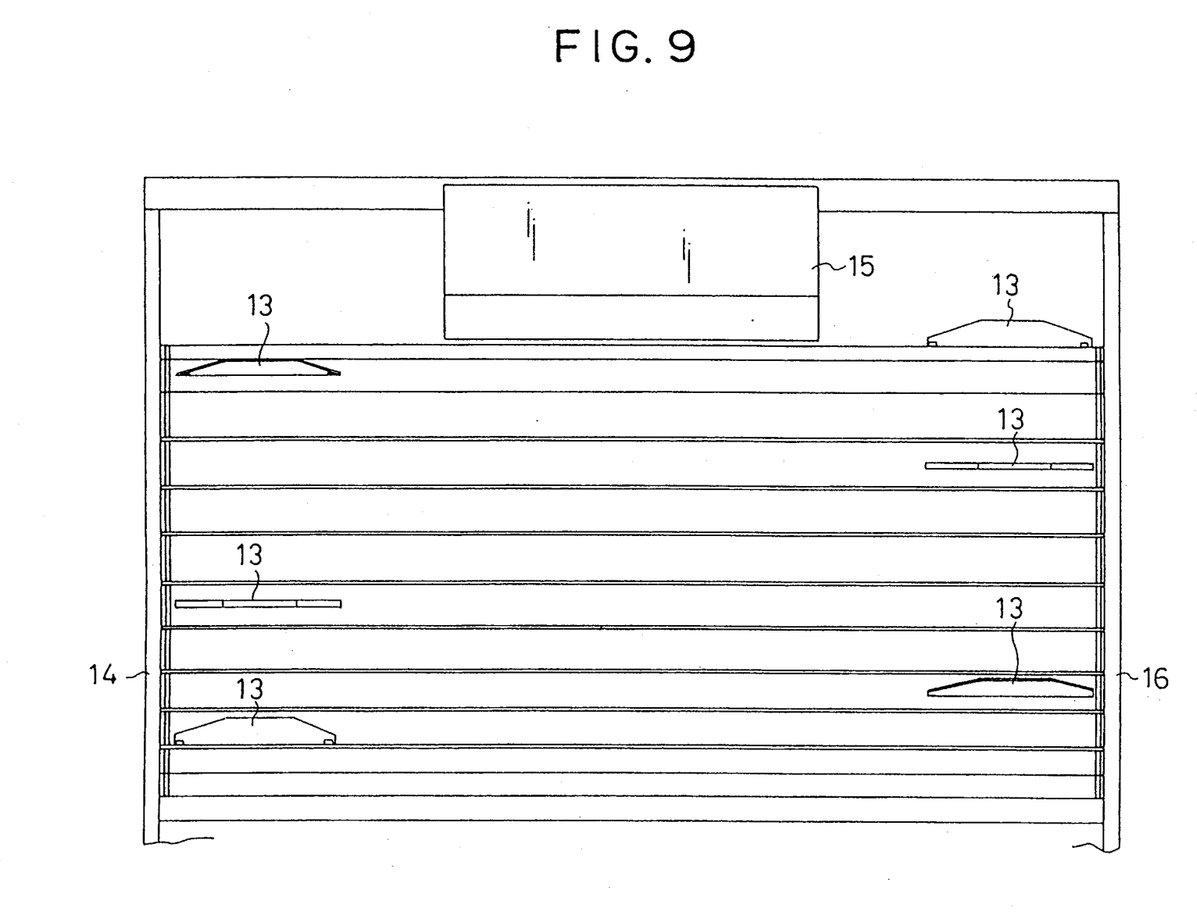
FIG. 9 is an enlarged right side view of still another embodiment of the present invention.

As shown in FIG. 9, the support plates 13 may be erected on both sides in a staggered relationship.

Figure 10:
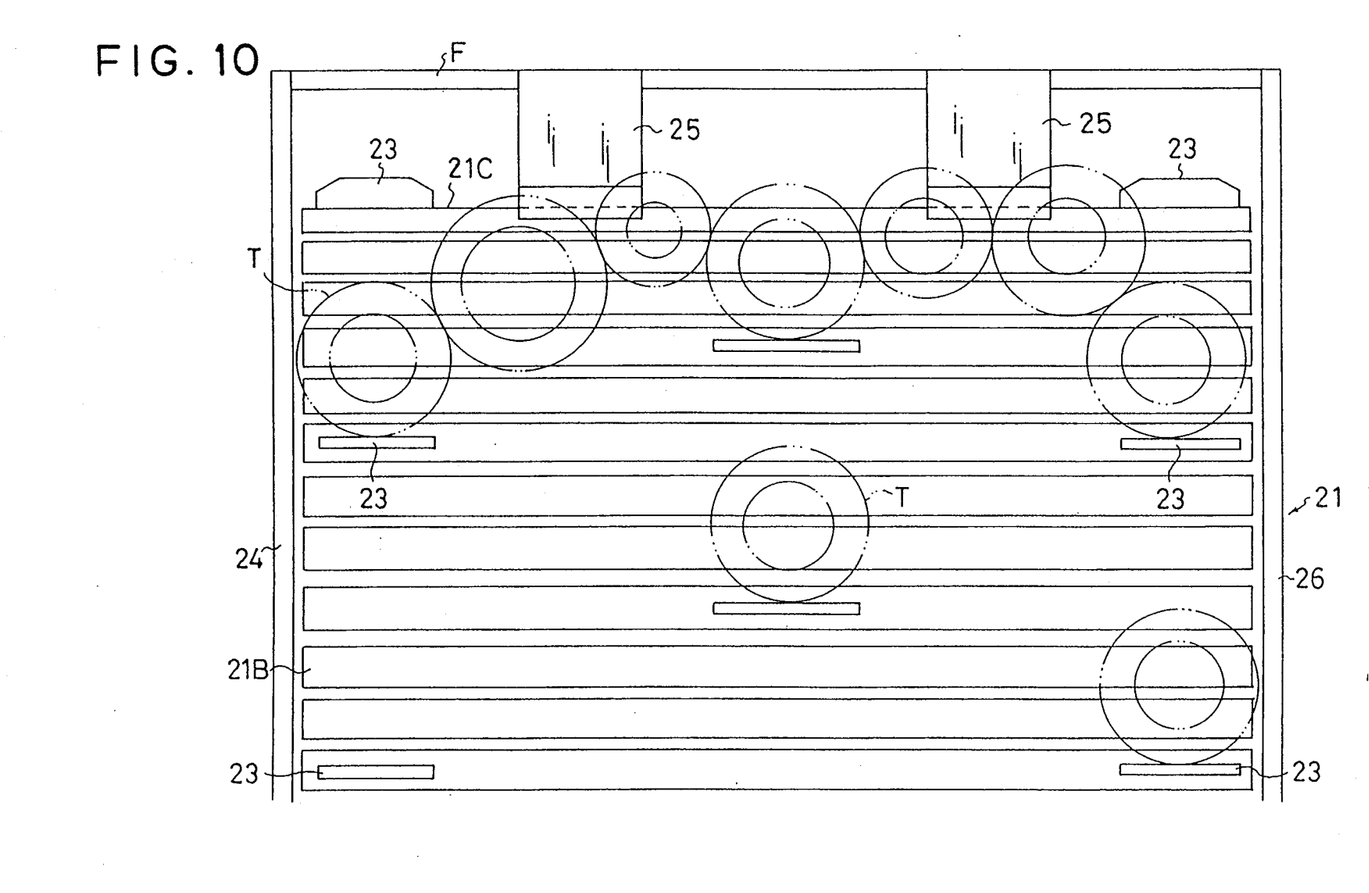
FIG. 10 is an enlarged right side view of a further embodiment of the present invention.

FIG. 10 shows still another embodiment of the present invention in a right hand side view of a rubber tire individual separation and conveyance apparatus. In this embodiment, the slat conveyor 21 has a width which is still greater than that of the FIGS. 7-9 embodiments with a view to further increasing the supply capacity to a kiln. In this embodiment, the width of the slat conveyor 21 is more than five times larger than the diameter of the rubber tire to be conveyed and the individual conveyance surface sections are provided in three rows.

The transport surface of the individual separation conveyor 21 is divided into three individual conveyance surface sections and two sliding surface sections; on each individual conveyance surface section, trapezoidal rubber tire support plates 23 are secured in a staggered relationship in adjacent individual conveyance surface sections. The structure of the rubber tire support plates are the same as mentioned before with respect to support plates 3 and support plates 13. On both side edges of the individual conveyance surface sections, side walls 24 and 28 are installed upright to prevent the fall of the rubber tires during transport laterally from the surface of the slat conveyor 21.

At the upper end of the sliding surface sections, mixed-suspended state collapsing members 25 are protrusively installed close to the sliding surfaces. The mixed-suspended state collapsing members 25 have the width to let only each tire held by a support plate 23 pass such that the tires in a mixed-suspended state on the sliding surface sections may not be discharged to the horizontal discharge zone 21C. At the upper end of the sharply inclined individual conveyance zone 21B, the upper end of the accompanying tire abuts against the mixed-suspended state collapsing member 25, thereby forcibly breaking the mixed-suspended state of the tires so that they may go down the sliding zone so as to be returned to the horizontal take-in zone.

To a certain extent, it will be unavoidable that the tires as held by the central support plates 23 may fall off; however, the supply capacity will be positively improved compared with a case where there are only two rows of individual conveyance surface sections.

In the above description, embodiments having one to three rows of individual conveyance surface sections have been described. However, four or more individual conveyance surface sections may be provided so as to increase the supply capacity of rubber tires.

According to the invention, the transport surface of the slat conveyor is divided into an individual conveyance surface section and a sliding surface section; and a support plate in said individual conveyance surface section supporting only one rubber tire laid flat on said individual conveyance surface section is mounted at a larger pitch in the direction of transport than the maximum diameter of the rubber tire being conveyed. A mixed-suspended state of collapsing member is mounted on a frame of said slat conveyor so as to project toward said rubber tire sliding surface section. Not only is a single rubber tire separated and carried out by a support plate but also a plurality of tires not supported by the support plate but being carried upward together in the sharply inclined individual transport zone of the slat conveyor may be raised by the mixed-suspended state collapsing member which is fixedly mounted protrusively on the sliding surface section, and securely returned to the horizontal take-in zone. Therefore, in the horizontal discharge zone, the individual separation-transport apparatus can discharge the rubber tires one by one, displaying a further great effect of individual separation and transport of the rubber tires in a lump which are otherwise not easy to separate because of a great surface friction coefficient.

Since a plurality of rubber tire individual transport surface sections can be formed, the supply capacity of rubber tires to a kiln may be increased, thereby enabling disposal of a large number of rubber tires at one time.

We claim:

1. Apparatus for separating and transporting individual rubber tires comprising:
   a slat conveyor having a horizontal take-in zone, a sharply inclined individual transport zone, and a horizontal discharge zone, said slat conveyor having a rubber tire individual conveyance surface section and an adjacent rubber tire sliding surface section formed on its conveyance surface;
   stationary side walls erected along both side ends of slats of said slat conveyor;
   a support plate located in said individual conveyance surface and dimensioned to support only one rubber tire laid flat on said individual conveyance surface section, said support plate being mounted at a larger pitch in the direction of transport than the maximum diameter of the rubber tire being conveyed; and
   a mixed-suspended state collapsing member operatively connected to said slat conveyor so as to project toward said rubber tire sliding surface section.

2. Apparatus for separating and transporting individual rubber tires comprising:
   a slat conveyor having a horizontal take-in zone, a sharply inclined individual transport zone, and a horizontal discharge zone, said slat conveyor having a rubber tire individual conveyance surface section and an adjacent rubber tire sliding surface section each formed on its conveyance surface;
   an upright plate at one end of each slat of said slat conveyor in said individual conveyance surface section;
   a support plate located in said individual conveyance surface and dimensioned to support only one rubber tire laid flat on said individual conveyance surface section, said support plate being mounted at a larger pitch in the direction of transport than the maximum diameter of the rubber tire being conveyed; and
   a mixed-suspended state collapsing member mounted on a frame of said slat conveyor so as to project toward said rubber tire sliding surface section.

3. Apparatus for separating and transporting individual rubber tires comprising:
   a slat conveyor having a horizontal take-in zone, a sharply inclined individual transport zone, and a horizontal discharge zone, said slat conveyor having rubber tire individual conveyance surface sections and rubber tire sliding surface sections alternately formed on its conveyance surface;
   stationary side walls erected along both side ends of slats of said slat conveyor;
   a support plate located in said individual conveyance surface and dimensioned to support only one rubber tire laid flat on said individual conveyance surface section, said support plate being mounted at a larger pitch in the direction of transport than the maximum diameter of the rubber tire being conveyed; and
   a mixed-suspended state collapsing member operatively connected to said slat conveyor so as to project toward at least one of said rubber tire sliding surface sections.

* * * * *